(12) United States Patent
Mizuno et al.

(10) Patent No.: US 6,403,246 B1
(45) Date of Patent: Jun. 11, 2002

(54) FUEL CELL AND SEPARATOR FOR FUEL CELL

(75) Inventors: Masahiro Mizuno; Masanori Matsukawa, both of Aichi (JP)

(73) Assignees: Aisin Takaoka Co., Ltd., Toyota; Nippon Chemical Denshi Co., Ltd., Owariasahi, both of (JP)

(*) Notice: Subject to any disclaimer, the term of this patent is extended or adjusted under 35 U.S.C. 154(b) by 0 days.

(21) Appl. No.: 09/397,107

(22) Filed: Sep. 16, 1999

(30) Foreign Application Priority Data

Sep. 30, 1998 (JP) .................................... 10-277068

(51) Int. Cl.[7] .......................... H01M 8/02; B32B 15/20
(52) U.S. Cl. ........................ 429/34; 428/652; 428/658
(58) Field of Search .................... 205/85; 428/647, 428/648, 652, 658; 429/32, 34, 38, 39

(56) References Cited

U.S. PATENT DOCUMENTS

| 4,157,941 A | * | 6/1979 | Donakowski et al. | ......... 205/85 |
| 4,678,716 A | * | 7/1987 | Tzeng | .............. 428/648 X |
| 5,268,078 A | * | 12/1993 | Koyama et al. | .......... 205/85 X |
| 5,437,746 A | * | 8/1995 | Usui et al. | .............. 428/652 X |
| 5,489,489 A | * | 2/1996 | Swirbel et al. | ......... 428/647 X |

FOREIGN PATENT DOCUMENTS

| EP | 0780916 | 6/1997 |
| EP | 0898320 | 2/1999 |

* cited by examiner

*Primary Examiner*—Stephen Kalafut
(74) *Attorney, Agent, or Firm*—Burns, Doane, Swecker & Mathis, LLP

(57) ABSTRACT

A fuel cell and a separator for same meritorious in reducing the weight and improving resistance against corrosion. In a fuel cell having a separator 2, the separator 2 includes an aluminum-based substrate 6, an intermediate plating layer layered on the aluminum-based substrate 6 and a noble metal layer 72 layered on the intermediate plating layer. The intermediate plating layer can be made up of a zinc-substitution plating layer 70 and a copper plating layer 71. The noble metal layer 72 can be a silver plating layer.

18 Claims, 4 Drawing Sheets

FUEL CELL AND SEPARATOR FOR FUEL CELL

FIELD OF THE INVENTION

This invention relates to a fuel cell including a separator formed of an aluminum-based material, and a separator for a fuel cell formed of an aluminum-based material.

BACKGROUND OF THE INVENTION

A fuel cell is comprised of a plurality of unit cells arranged at a pre-set distance from one another along the direction of thickness, each unit cell being made up of a positive electrode and a negative electrode constituting a pair of electrodes, and an electrolyte film sandwiched between said positive and negative electrodes. In this fuel cell, the positive electrode faces a positive electrode chamber fed with an active material for the positive electrode, while the negative electrode faces a negative electrode chamber fed with an active material for the negative electrode. In this fuel cell, the negative electrode chamber, fed with the active material for the negative electrode, is partitioned by a separator from the positive electrode chamber, and fed with the active material for the positive electrode.

In the fuel cell, the separator undergoes corrosion and deterioration dep ending on the environment in which the cell is used. Thus, with the fuel cell, power generating characteristics after prolonged use for power generation tends to be lowered in comparison with the initial power generating characteristics. Thus, the separator is customarily prepared form a carbon material less susceptible to deterioration due to corrosion. There has hitherto been known a fuel cell formed of stainless steel or titanium which forms a strong inactivated film retained to exhibit resistance against corrosion.

SUMMARY OF THE DISCLOSURE

However, in the course of the investigations toward the present invention the following problems have been encountered. Namely, the separator formed of a carbon material is highly expensive because of the high cost of the material itself. In addition, since the material is brittle, the separator is increased in thickness, thus restricting reduction in size of the fuel cell.

The separator formed of stainless steel, while being meritorious for size reduction because of its superior strength, is not meritorious for reduction in weight because of the high specific gravity of the material. On the other hand, the separator formed of titanium, which is meritorious for size reduction because of its superior strength, is not meritorious for cost reduction because of its high material cost, nor sufficient for weight reduction because of its specific gravity.

Recently, the present Assignee has conducted research and development of a separator formed of an aluminum based material of a low specific gravity for reducing the weight and the cost of the separator.

In the separator constituting a fuel cell, since an electrically conductive path is produced along its direction of thickness, it is not desirable that an oxide film be formed on a surface layer of an aluminum-based material constituting the separator. It is therefore not desirable to process the separator formed of the aluminum-based material with anodic oxidation to generate an anodic oxide film. Thus, the fuel cell with a built-in separator formed of the aluminum-based material is not sufficient in durability against corrosion.

In view of the above-depicted status of the art, it is an object of the present invention to provide a fuel cell and a separator for the fuel cell meritorious in reducing the weight and improving resistance against corrosion.

The present inventors have conducted eager searches into developing a separator for a fuel cell formed of an aluminum-based material, and found that, if the separator is a of a layered structure comprised of an aluminum-based substrate, at least one intermediate plating layer layered on the aluminum-based substrate and a noble metal layer layered on the intermediate plating layer, with the intermediate plating layer being mainly composed of at least one of zinc, copper and tin, it becomes meritoriously possible to reduce the weight of the separator, to improve resistance against corrosion, to procure adherent power of the noble metal plating layer and resistance against corrosion of the noble metal plating layer and to reduce the resistance to electrical resistance in the thickness direction. This information, confirmed by tests, led to development of the separator and the fuel cell according to the present invention.

A fuel cell according to a first aspect of the present invention includes a plurality of unit cells arranged at a pre-set distance from one another along the direction of thickness, each unit cell being made up of a positive electrode and a negative electrode constituting a pair of electrodes, and an electrolyte film sandwiched between the positive and negative electrodes, and a plurality of separators, each arranged between neighboring ones of the unit cells for separating a negative electrode chamber facing the negative electrode and a positive electrode chamber facing the positive electrode. The negative electrode chamber and the positive electrode chamber are fed with an active material for the negative electrode and with an active material for the positive electrode, respectively. The separator includes an aluminum-based substrate, at least one intermediate plating layer layered on the aluminum-based substrate and a noble metal layer layered on the intermediate plating layer. The intermediate plating layer is mainly composed of at least one of zinc, copper and tin.

With the fuel cell according to the present invention, since the separator is mainly formed of an aluminum-based substrate, it can be reduced in weight. Moreover, since various plating layers are layered in the above-described order on the aluminum-based substrate constituting the separator, it is possible to suppress corrosion and deterioration of the separator.

According to a second aspect of the present invention, there is provided a separator for a fuel cell, i.e., a separator for partitioning a negative electrode chamber fed with an active material for the negative electrode and a positive electrode chamber fed with an active material for the negative electrode from each other. The separator includes an aluminum-based substrate, at least one intermediate plating layer layered on the aluminum-based substrate and a noble metal layer layered on the intermediate plating layer. The intermediate plating layer is mainly composed of at least one of zinc, copper and tin.

Since the separator for the fuel cell according to the present invention is mainly comprised of an aluminum-based substrate, it can be reduced in weight. Moreover, since various plating layers are layered in the above-described order on the aluminum-based substrate constituting the separator, it is possible to suppress corrosion and deterioration of the separator.

PREFERRED EMBODIMENTS OF THE INVENTION

According to the present invention, a well-known aluminum-based material may be used as a material for an aluminum-based substrate constituting separator. For example, pure Al, Al—Mg, Al—Si, Al—Mg—Si, Al—Mn or Al—Zn based materials may be used, i.e., Al or Al alloys.

According to the present invention, the intermediate plating layer may be constituted by at least one of a zinc plating layer, a copper plating layer and a tin plating layer. The zinc plating layer is preferably a zinc substitution plating layer for securing adherent power to the aluminum-based substrate. The intermediate layer may, for example, be made up of a zinc substitution plating layer, layered on the aluminum-based substrate, and a copper plating layer, layered on the zinc substitution plating layer. Typical of the noble metal layers is a silver plating layer in view of electrical conductivity and material cost. The plating herein means coating a metallic material and the plating method includes plating processing such as chemical plating and electrical plating.

If two or more layers are used as the intermediate plating layer, the layers are preferably arranged in the order of decreasing ionization tendency from the aluminum-based substrate side.

BRIEF DESCRIPTION OF THE INVENTION

EXAMPLES

Figure 1:
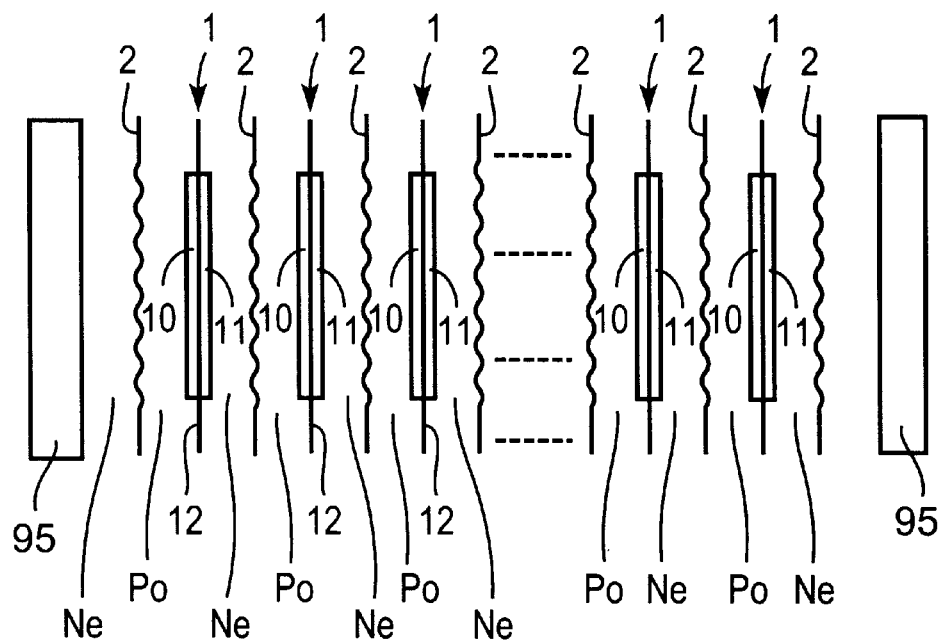
FIG. 1 is a schematic exploded view showing a solid high-molecular film type fuel cell including unit cells and separators.

Referring to the drawings, embodiments of the present invention, as applied to a polymer solid electrolyte fuel cell, are explained.

FIG. 1 schematically shows a layered structure of the polymer solid electrolyte fuel cell.

Referring to FIG. 1, plural unit cells 1 are arrayed in juxtaposition at a pre-set interval between outer frames 95, 95. Each unit cell 1 is made up of a positive electrode (anode, i.e., a "cathode" according to U.S. standard terminology) 10 and a negative electrode (cathode, i.e., an "anode" according to U.S. standard terminology) 11 constituting paired electrodes and a film-shaped polymer solid electrolyte membrane 12 exhibiting proton transmitting properties and which is sandwiched between the positive electrode 10 and the negative electrode 11.

As may be understood from FIG. 1, a separator 2 operating as an active material separator partitioning a negative electrode chamber Ne and a positive electrode chamber Po in a back-to-back relation. The negative electrode chamber Ne faces the negative electrode 11 and is fed with an active material for the negative electrode, such as a hydrogen-containing gas. The positive electrode chamber Po faces the positive electrode 10 and is fed with an active material for the positive electrode, such as air.

Figure 2:
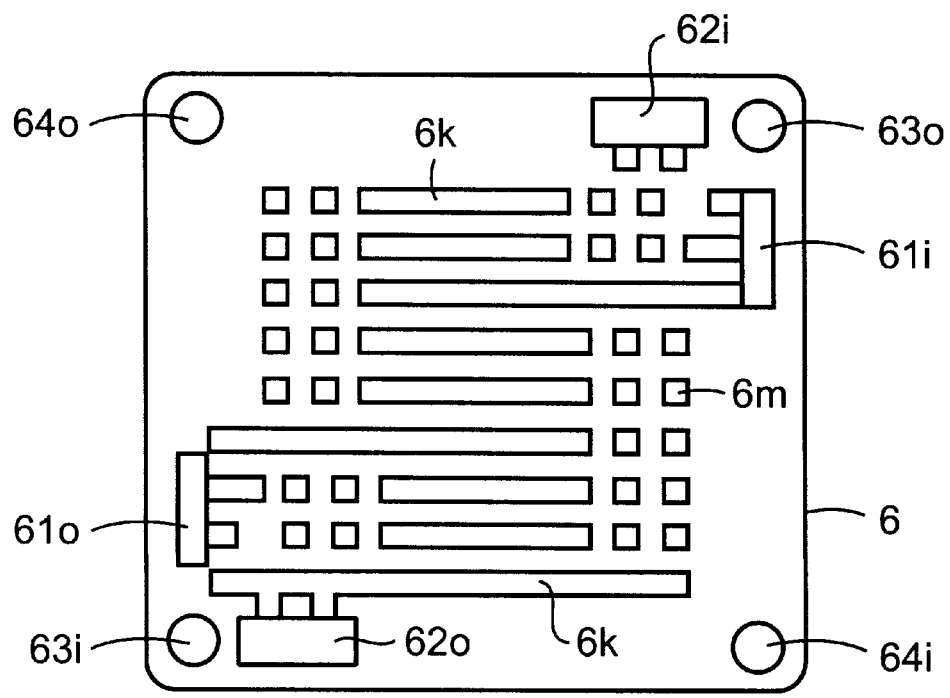
FIG. 2 is a plan view showing an aluminum-based substrate.

The separator 2 is mainly comprised of a press-molded aluminum-based substrate 6 (thickness and material of the substrate being 0.3 mm and Al—Mg based material, respectively, JIS-A5052). As shown in FIG. 2, at the marginal part of the aluminum-based substrate 6 there are formed, by press working, through-holes 61$i$, 61$o$, passed through by an active material for the negative material, through-holes 62$i$, 62$o$, passed through by an active material for the positive material, through-holes 63$i$, 63$o$, passed through by a cooling medium, and positioning holes 64$i$, 64$o$. The through-holes 61$i$, 61$o$, 62$i$, 62$o$, 63$i$, 63$o$ and 64$i$, 64$o$ are all through-holes along the direction of thickness. In the present specification, the suffix i basically means an inlet, with the suffix o being an outlet. In addition, the aluminum-based substrate 6 is formed as-one with a large number of bulged-out molded portions 6$k$, 6$m$ providing flow passages for the active material.

Figure 3:
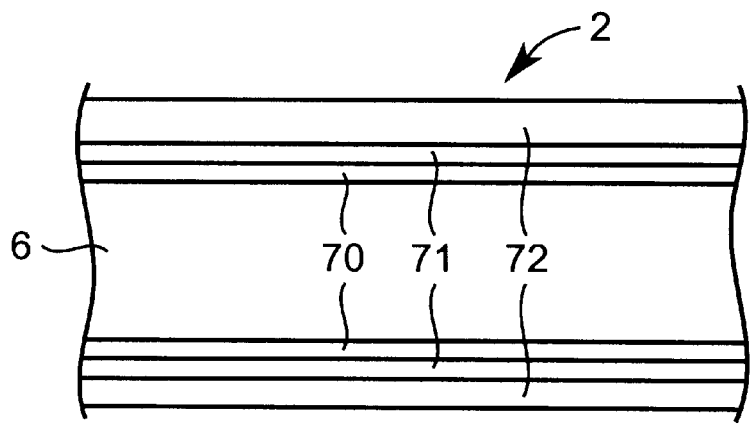
FIG. 3 is a schematic enlarged cross-sectional view showing a plating layer layered on an aluminum-based substrate.

On the front and back surfaces of the aluminum-based substrate 6, there are formed a zinc substitution plating layer 70, as an intermediate plating layer, and a copper plating layer 71, as an intermediate plating layer, successively, as may be seen from FIG. 3. On the copper plating layer 71, there is layered a silver plating layer 72, as a noble metal plating layer.

In the present embodiment, the respective layers are layered in the order of the decreasing ionization tendency (Al>Zn>Cu>Ag). That is, the respective layers are layered in the order of the decreasing ionization tendency, as from the aluminum-based substrate 6, so that the ionization tendency becomes lower towards the Ag layer.

In the present embodiment, the alkali defatting, etching and acid immersion are carried out in this order on the aluminum-based substrate 6 as pre-processing steps. The plating processing operations then are performed on the aluminum-based substrate 6 in the sequence of the zinc substitution plating (chemical plating), copper striking (electrical plating), silver striking (electrical plating) and silver striking (electrical plating). Water-washing is carried out between the respective plating operations.

Table 1 shows the alkali defatting. Tables 2 and 3 show the conditions for the etching and for the acid immersion, respectively. In addition, Tables 6 and 7 show the conditions for silver striking and for silver plating, respectively.

TABLE 1

| Alkali Defatting | |
|---|---|
| Sodium tertiary phosphate (Na$_3$PO$_4$) | 9 g/L |
| Sodium metasilicate (Na$_2$SiO$_3$) | 12 g/L |
| Sodium hydrogen carbonate (NaHCO$_3$) | 6 g/L |
| Surfactant | 1 g/L |
| Liquid temperature | 60° C. |

TABLE 2

| etching | |
|---|---|
| Sodium hydroxide | 4 g/L |
| Sodium carbonate | 30 g/L |
| Sodium phosphate | 30 g/L |
| Temperature | 60° C. |
| Time | 3 minutes |

TABLE 3 acid immersion

| | |
|---|---|
| Sulfuric acid 150 mL/L | nitric acid 50% |
| Temperature 60° C. → | temperature, room temperature |
| time, 30 seconds | time, 30 seconds |

TABLE 4 zinc substitution plating

| | |
|---|---|
| sodium hydroxide | 50 g/L |
| zinc oxide | 5 g/L |
| ferric chloride | 2 g/L |
| Rochelle salt | 50 g/L |
| sodium nitrate | 1 g/L |
| temperature | 25° C. |
| time | 30 seconds |

TABLE 5 copper striking

| | |
|---|---|
| copper cyanide | 24 g/L |
| sodium cyanide | 50 g/L |
| sodium carbonate | 30 g/L |
| free cyan | 5.7 g/L |
| Rochelle salt | 60 g/L |
| temperature | 50° C. |
| current density | 2.6 A/dm$^2$ |
| pH | 10.3 |
| anode | copper |

TABLE 6 silver striking

| | |
|---|---|
| silver cyanide | 1 g/L |
| sodium cyanide | 90 g/L |
| temperature | 27° C. |
| current density | 2.0 A/dm$^2$ |

TABLE 7 silver plating

| | |
|---|---|
| silver cyanate | 30 g/L |
| sodium cyanate | 55.5 g/L |
| potassium carbonate | 45 g/L |
| free potassium cyanate | 41.3 g/L |
| temperature | 27° C. |
| current density | 2.0 A/dm$^2$ |
| brightener | few drops/L |

The above-mentioned etching is mainly aimed at removing natural oxide films on the aluminum-based substrate 6 to provide a surface presenting micro-irregularities to improve the intimate adherent power of the plating layer. The above-mentioned acid immersion is mainly aimed at removing smuts on the aluminum-based substrate 6. The above-described zinc substitution plating exhibits high oxide film removing performance on the surface layer of the aluminum-based substrate 6 so that it is possible to improve the adhesion power of the zinc substitution plating layer 70.

In the present embodiment, the zinc substitution plating layer 70 has a thickness of 0.001 to 0.01 μm, while the copper plating layer 71 has a thickness of 0.02 to 0.1 μm, and the silver plating layer 72 has a thickness of 1.5 to 2.5 μm.

However, the present invention is not limited to these thickness values. The thickness of the zinc substitution plating layer 70 is based on observation through an electron microscope. The thicknesses of the copper plating layer 71 and the silver plating layer 72 were measured by a film thickness meter.

On the rim of the aluminum-based substrate 6 was layered a rubber layer and unified with the rim to constitute a separator. The power generating characteristics of the fuel cell, into which was assembled the present separator, were excellent on prolonged use. Testings.

Test pieces obtained by the above embodiments were used to conduct a test on the adhesive power. Also, the separators by the above-described embodiments were used in a power generation test to measure the resistance to electrical conduction and the ratio of the attacked surface to the non-attacked surface. The test pieces and the separator are obtained on sequentially layering the substitution zinc plating layer, copper plating layer and a silver plating layer on the aluminum-based substrate, based on each processing and plating thicknesses explained in the above embodiment.

The adherent power test was conducted by forming meshes of a 2 mm interval to a test piece, and peeling the meshes off using an adhesive tape, according to JIS-H8504 (tape testing method). The resistance to electrical conduction and the area ratio of the attacked surface to the non-attacked surface were measured on actually conducting a power generation test using three separators (Nos.1 to 3) and disintegrating the fuel cell every 200 hours.

In measuring the resistance to electrical conduction, three separators (Nos.1 to 3) and two electrode substrates (Nos.1 and 2) were used, and the electrode substrates were sandwiched by the separators by alternately arranging the separators and the electrode substrates in the thickness direction. Thus, the separators and the electrode substrates were arranged in the sequence of the separator No.1, electrode substrate No.1, separator No.2, electrode substrate No.2 and the separator No.3. On the outer sides of both end separators No.1 and No.3 were placed a pair of current collecting plates. With the three separators, voltmeters were mounted for measuring the voltage across the neighboring separators Nos.1 and Nos.2 and that across the neighboring separators Nos.2 and Nos.3. The current was allowed to flow across the paired collecting plates and the voltage values on the voltmeters were read. The voltages as measured on the respective voltmeters were read. The voltage values as read on the voltmeters were calculated in terms of the electrical resistance to find the resistance to electrical conduction.

Figure 5:
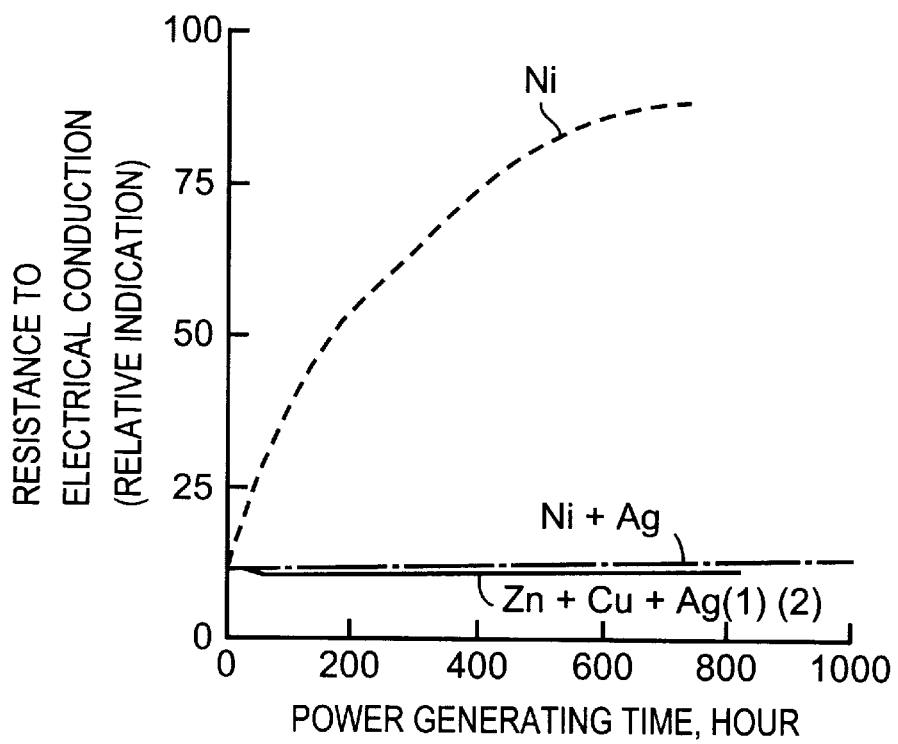
FIG. 5 is a graph showing the results of a test on resistance to electrical conduction.

In the present test, the resistance to electrical conduction across the neighboring separators (Nos.1 and 2) was stated as (1), while that across the neighboring separators (Nos.2 and 3) was stated as (2), as shown in FIG. 5.

For finding the area ratio of the attacked (corroded) surface to the non-attacked surface, the amount of the corrosion product produced on the facing surfaces of the separators Nos.1 and 2 on both sides of the electrode substrate No.1 was measured to find the ratio of the amount (area) of the corrosion product on the separator surface to find the surface occupying ratio of the corrosion product. The ratio thus found is indicated as the area ratio of the attacked surface to the separator surface for (1) shown in FIG. 6. In a similar manner, the amount of the corrosion product produced on the facing surfaces of the separators Nos.1 and 2 on both sides of the electrode substrate No.2 was measured to find the ratio of the amount of the corrosion product on the separator surface to find the surface occupying ratio of the corrosion product. The ratio thus found is indicated as the ratio of the attacked surface to the non-attacked surface for (2) shown in FIG. 6.

Similar tests were conducted in Comparative Examples. The plating thicknesses for the Comparative Examples were set so as to be equivalent to the plating thicknesses of the Embodiments. In layering a silver plating layer in the Comparative Example, the silver plating layer was an outermost layer.

Figure 4:
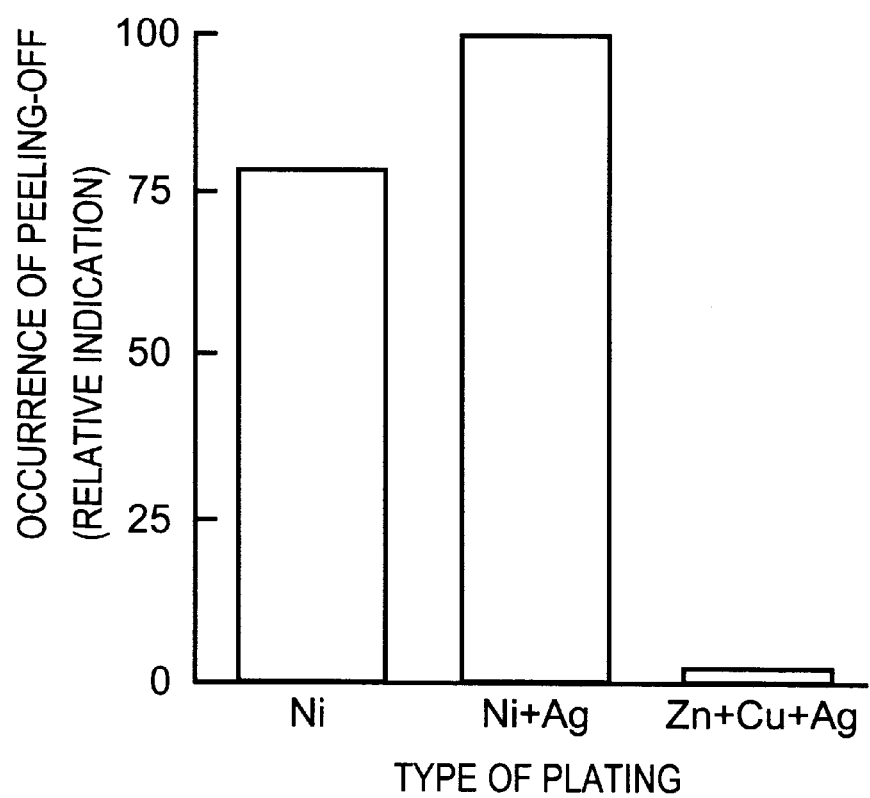
FIG. 4 is a graph showing the results on a test on adherent power.
Figure 6:
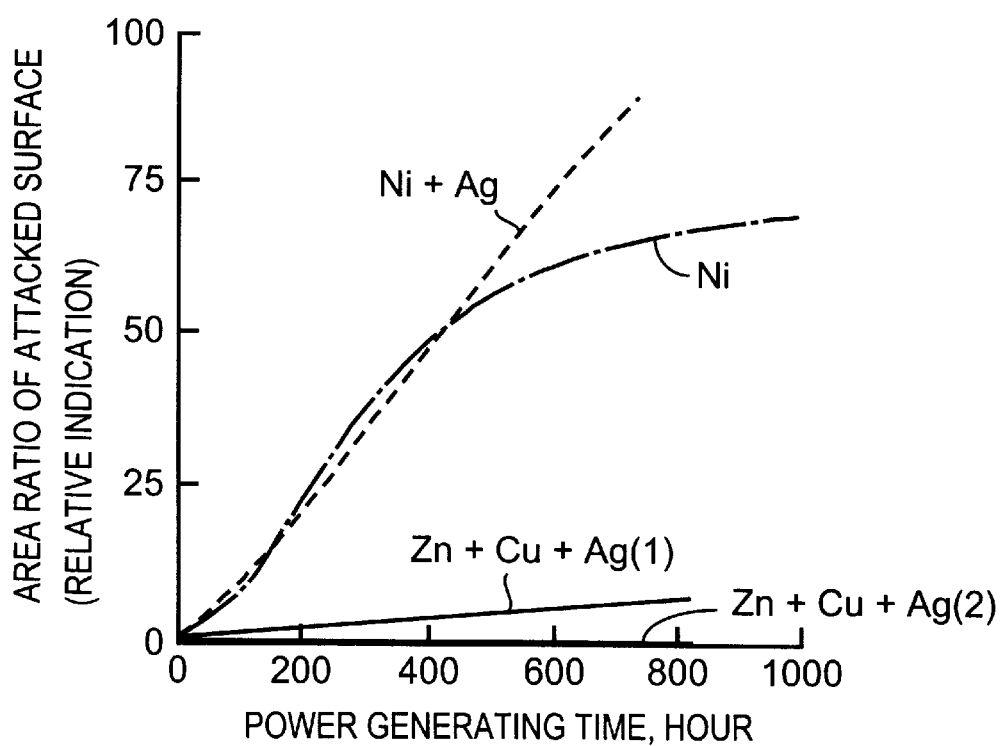
FIG. 6 is a graph showing the results of a corrosion test.

The results of the adherent power test, a test on the resistance to electrical conduction and a test on corrosion are shown in FIGS. 4 to 6, respectively. The vertical axes of FIGS. 4 to 6 denote values of relative indication (arbitrary, relative scale).

As for the adherent power test, the ratio of generation of peeling off was approximately 75 in the relative indication in the case of test pieces of the Comparative Example in which only a Ni plating layer was layered on the aluminum-based substrate, as shown in FIG. 4. In the case of test pieces of the Comparative Example in which the Ni plating layer and the Ag plating layer were layered on an aluminum-based substrate, the ratio of occurrence of peeling-off was 100 in terms of the relative indication, which was higher than that in the Comparative Example in which only the Ni layer was layered. In the case of test pieces of the Embodiment in which the combination of the Zn plating layer, Cu plating layer and the Ag plating layer were layered on the aluminum-based substrate, the ratio of occurrence of the peeling-off was almost nil. This means that, if a silver plating layer is to be layered as an outermost layer, it is highly effective to array a copper plating layer below a silver plating layer and to array a zinc plating layer below the copper plating layer to provide an Al—Zn—Cu—Ag layering configuration.

As for the conduction resistance test, the resistance to electrical conduction is increased with lapse of time and approaches to 100 in relative indication after lapse of a long time. This is presumably due to the effect ascribable to the corrosion product. In the case of a separator in which the combination of the Ni plating layer and the Ag plating layer was layered on the aluminum-based substrate, the resistance to electrical conduction was scarcely increased after lapse of the test time. In the case of a separator of an embodiment in which the combination of the Zn plating layer, Cu plating layer and the Ag plating layer was layered on the aluminum-based substrate, the resistance to electrical conduction was scarcely increased after lapse of the test time for both (1) and (2).

As for the corrosion test, the ratio of the attacked surface to the non-attacked surface for a separator of the Comparative Example comprised of the Ni plating layer and the Ag plating layer layered on the aluminum-based substrate is increased with lapse of the test time to approach 100 in relative indication, as shown in FIG. 6. The ratio of the attacked surface to the non-attacked surface was similarly increased with lapse of the test time in the case of a separator of the Comparative Example comprised of only the Ni plating layer layered on the aluminum-based substrate. On the other hand, the separator of an embodiment in which the combination of the Zn plating layer, Cu plating layer and the Ag plating layer was layered on the aluminum-based substrate, corrosion was insignificant for both (1) and (2).

The results of FIGS. 5 and 6 indicate that if, when the silver plating layer is layered as an outermost layer, it is desired to suppress the resistance to electrical conduction from increasing and to improve resistance to corrosion, it is highly effective to arrange the copper plating layer below the silver plating layer and to layer a zinc substitution plating layer therebelow to provide an Al—Zn—Cu—Ag layering configuration.

Applied Examples

Figure 7:
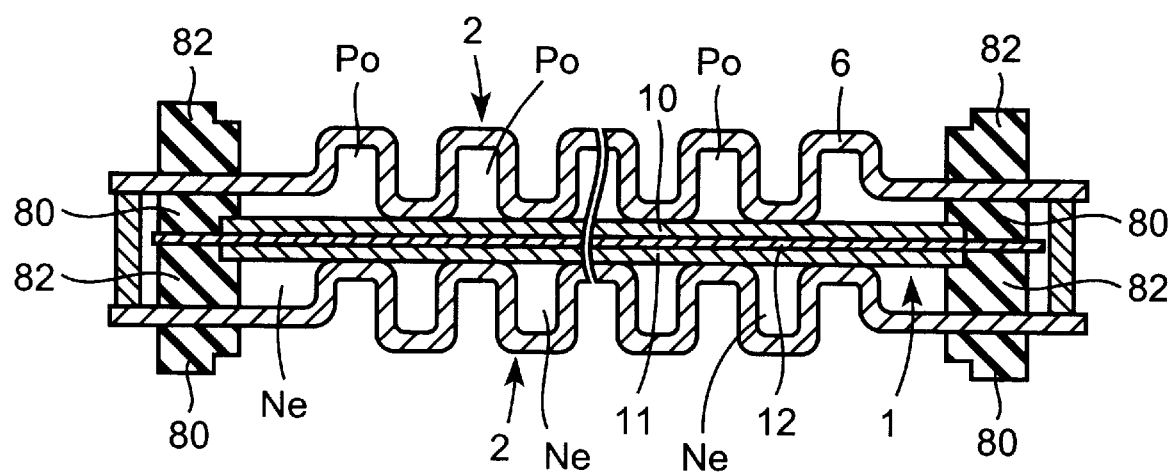
FIG. 7 is a cross sectional view showing an applied example.

FIG. 7 shows an applied example, in which a rubber layer 80 is layered integrally on the surface of the aluminum-based substrate 6, and a rubber layer 82 is layered integrally on the back surface of the aluminum-based substrate 6. The unit cell 1 is made up of a positive electrode 10 and a negative electrode 11, constituting paired electrodes, and a film-shaped high-molecular solid electrolytic film 12, exhibiting protonic transmission properties and which is sandwiched between the positive electrode 10 and the negative electrode 11. As may be understood from FIG. 7, the separator 2, functioning as a separator of the active material, defines the negative electrode chamber Ne and the positive electrode chamber Po in a back-to-back relation to each other. The negative electrode chamber Ne faces the negative electrode 11 and is fed with an active material of the negative electrode, such as a hydrogen-containing gas. The positive electrode chamber Po faces the negative electrode 11 and is fed with an active material for the positive electrode, such as air. A number of the separators 2 and similarly a large number of the unit cells 1 are assembled in a juxtaposed fashion to constitute a fuel cell.

Meritorious Effects of the Invention

With the fuel cell according to the present invention, since the separator mainly comprised of an aluminum-based substrate is used, the fuel cell can be reduced in weight. Moreover, with the present invention, it is advantageous in procuring the adhesive power of the plating layer and resistance to corrosion, as well as reducing the resistance to electrical resistance in the thickness direction.

With the separator for the fuel cell according to the present invention, mainly comprised of an aluminum-based substrate, it is possible to reduce the weight of the separator. It is moreover possible to procure the adherent power of the plating layer and resistance to corrosion as well as to reduce the resistance to electrical resistance along the thickness direction.

It should be noted that other objects and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A fuel cell comprising:
   a plurality of unit cells arranged at a distance from one another along the direction of thickness, each unit cell being made up of a positive electrode and a negative electrode constituting a pair of electrodes, and an electrolyte film sandwiched between said positive and negative electrodes; and
   a plurality of separators, each arranged between neighboring ones of said unit cells for separating a negative electrode chamber facing said negative electrode and a positive electrode chamber facing said positive electrode, said negative electrode chamber and the positive electrode chamber being fed with an active material for the negative electrode and with an active material for the positive electrode, respectively;
   wherein said separator has an aluminum-based substrate, at least one intermediate plating layer layered on the aluminum-based substrate and a noble metal layer layered on the intermediate plating layer, said intermediate plating layer comprising at least one of zinc, copper and tin.

2. The fuel cell according to claim 1, wherein said intermediate layer includes a zinc substitution plating layer layered on said aluminum-based substrate and a copper plating layer layered on said zinc substitution plating layer.

3. The fuel cell according to claim 1 wherein said noble metal layer is a silver plating layer.

4. The fuel cell according to claim 2, wherein said noble metal layer is a silver plating layer.

5. The fuel cell according to claim 1, wherein said at least one intermediate plating layer comprises two or more intermediate plating layers in the order of decreasing ionization tendency from the aluminum-based substrate side.

6. The fuel cell according to claim 5, wherein said at least one intermediate plating layer is made up of a combination of a zinc plating layer disposed on said aluminum-based substrate and a copper plating layer disposed on the zinc plating layer.

7. The fuel cell according to claim 1, wherein said intermediate plating layer mainly comprises at least one of zinc, copper and tin.

8. The fuel cell according to claim 1, wherein the intermediate plating layer comprises at least one of a zinc layer having a thickness of 0.001 to 0.01 $\mu$m, a copper layer having a thickness of 0.02 to 0.1 $\mu$m, and a tin layer, and wherein the noble metal layer comprises a silver layer having a thickness of 1.5 to 2.5 $\mu$m.

9. A fuel cell unit, comprising:
(a) a separator for a fuel cell for partitioning a negative electrode chamber fed with an active material for the negative electrode and a positive electrode chamber fed with an active material for the positive electrode, from each other, comprising an aluminum-based substrate, at least one intermediate plating layer layered on the aluminum-based substrate and a noble metal layer layered on the intermediate plating layer, said intermediate plating layer comprising at least one of zinc, copper and tin,
(b) the negative electrode chamber, and
(c) the positive electrode chamber,
wherein the separator is positioned between the negative electrode chamber and the positive electrode chamber.

10. The fuel cell unit according to claim 9, wherein said intermediate layer includes a zinc substitution plating layer layered on said aluminum-based substrate and a copper plating layer layered on said zinc substitution plating layer.

11. The fuel cell unit according to claim 9, wherein said noble metal layer is a silver plating layer.

12. The fuel cell unit according to claim 11, wherein said at least one intermediate plating layer is made up of a combination of a zinc plating layer disposed on said aluminum-based substrate and a copper plating layer disposed on the zinc plating layer.

13. The fuel cell unit according to claim 9, wherein said at least one intermediate plating layer is made up of a combination of a zinc plating layer disposed on said aluminum-based substrate and a copper plating layer disposed on the zinc plating layer.

14. The fuel cell unit according to claim 9, wherein said aluminum-based substrate is selected from the group consisting of Al and Al-alloy.

15. The fuel cell unit according to claim 14, wherein said Al-alloy is selected from the group consisting of Al—Mg, Al—Si, Al—Mg—Si, Al—Mn and Al—Zn.

16. The fuel cell unit according to claim 9, wherein said intermediate plating layer mainly comprises at least one of zinc, copper and tin.

17. The fuel cell unit according to claim 9, wherein the intermediate plating layer comprises at least one of a zinc layer having a thickness of 0.001 to 0.01 $\mu$m, a copper layer having a thickness of 0.02 to 0.1 $\mu$m, and a tin layer, and wherein the noble metal layer comprises a silver layer having a thickness of 1.5 to 2.5 $\mu$m.

18. A separator for a fuel cell for partitioning a negative electrode chamber fed with an active material for the negative electrode and a positive electrode chamber fed with an active material for the positive electrode, from each other, comprising:
an aluminum-based substrate, at least one intermediate plating layer layered on the aluminum-based substrate and a noble metal layer layered on the intermediate plating layer, said intermediate plating layer being mainly composed of at least one of zinc, copper and tin,
wherein said intermediate layer includes a zinc substitution plating layer layered on said aluminum-based substrate and a copper plating layer layered on said zinc substitution plating layer, and wherein said noble metal layer is a silver plating layer.

* * * * *